March 24, 1942.  F. BERGTOLD  2,277,474
HIGH FREQUENCY IRON CORE
Filed Nov. 10, 1939

INVENTOR.
FRITZ BERGTOLD
BY
ATTORNEY.

Patented Mar. 24, 1942

2,277,474

UNITED STATES PATENT OFFICE 2,277,474

HIGH FREQUENCY IRON CORE

Fritz Bergtold, Munich, Germany, assignor to Telefunken Gesellschaft für Drahtlose Telegraphie m. b. H., Berlin, Germany, a corporation of Germany Application November 10, 1939, Serial No. 303,821
In Germany November 12, 1938

3 Claims. (Cl. 175—21)

It has been the custom to produce high frequency iron cores from very thin insulated wires. The results obtained therefrom have not been very satisfactory. It is in part for this reason and also because of the difficulty involved in making wire cores that there has been a tendency to employ so-called compressed iron powder cores. It is obvious that in cores composed of compressed iron powder there exist inter-spaces between the individual iron particles not only laterally to the direction of the magnetic field but also in the direction of the field. Because of this fact, it is not possible to obtain as high permeabilities with iron powder cores as can be obtained with cores made of wires.

Figure 1:

In accordance with the invention, thin iron wires which are insulated from one another are woven together in the manner of high frequency litz wires. Just as in the case of these high frequency litz wires, group combined weavings are resorted to so that the entire iron core instead of consisting of a single woven wire rope according to Fig. 1 is formed of a group of such wire ropes woven together and which may again be formed of several sub-groups. In place of individual very thin wires, iron bands may be employed which are made, for instance, by electrolytically depositing iron on non-conductors.

The weaving together has the result that the magnetic fields despite the capacitively closed eddy current paths, are distributed over the entire cross section uniformly in a manner similar to the high frequency currents in the high frequency litz wires. With iron cores owing to the concentric annular eddy current circuits extending on the individual cross sections, the magnetic field will be weakened in the interior of the core because of the fact that the eddy currents cause a counterfield.

Figure 2:
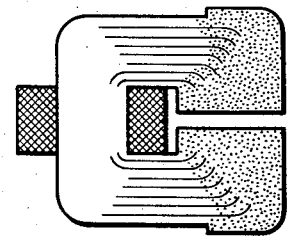

The iron cores in accordance with the invention in a manner similar to the cores produced from iron powder, can be given any desired core shape through a special addition of insulating material or by utilizing the insulations of the wires proper through subsequent pressing. The pole pieces or the places at which individual core parts come together may, for instance, be pressed on in the form of the customary high frequency iron as shown in Fig. 2. In this figure, the iron wires are only indicated and furthermore an air gap is provided into which, for instance, for the purpose of adjusting the inductance an electrically conducting disk can be inserted.

The invention contemplates employing wires whose thickness is so small that the losses are in the same order as in the case of mass cores. An advantage of the invention resides in the fact that the reluctance is decreased as compared with cores having parallel wires and that also the effective permeability is increased. At the same time losses are decreased on account of the more uniform distribution of the magnetic field on the individual wires because the losses increase with the field density for the same reason that if the same current is flowing through two wires one of which is one-half the size of the other, the losses in the smaller wire would be greater than the losses in the larger wire.

I claim:

1. A U-shaped core for a high frequency inductance coil, said core being composed of a plurality of compressed interwoven litz wires, each of said wires extending substantially along the direction of the magnetic field.

2. A core such as described in claim 1 characterized by that its two ends are composed of compressed powdered magnetic material.

3. A core for a high frequency inductance device, said core having two end portions and an intermediate portion, said end portions being composed of compressed powdered magnetic material, and said intermediate portion being composed of a plurality of interwoven lengths of thin insulated iron wires each extending in the direction of the magnetic field of the core substantially the full length of the intermediate portion of the core.

FRITZ BERGTOLD.